(12) United States Patent
Davis et al.

(10) Patent No.: US 6,544,567 B1
(45) Date of Patent: *Apr. 8, 2003

(54) REDUCED FAT YOGURT PREPARATION

(75) Inventors: Martin E. Davis, Tonka Bay, MN (US); Jean Claude Bruneau, Londonderry, NH (US); Laurie Nelson, Bloomington, MN (US)

(73) Assignee: Davisco Foods International, Inc., LeSueur, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 329 days.

(21) Appl. No.: 08/948,877

(22) Filed: Oct. 10, 1997

(51) Int. Cl.[7] .................................................. A23C 9/12
(52) U.S. Cl. ............................ 426/34; 426/41; 426/43; 426/74; 426/583
(58) Field of Search ......................... 426/34, 580, 583, 426/41, 42, 43, 74, 656, 657

(56) References Cited

U.S. PATENT DOCUMENTS

| 4,163,802 A | 8/1979 | Redfern et al. ................ 426/43 |
| 4,225,623 A | 9/1980 | Stussi ........................... 426/42 |
| 4,258,064 A | 3/1981 | Michener ...................... 426/43 |
| 4,714,616 A | 12/1987 | Kao .............................. 426/42 |
| 5,449,523 A | 9/1995 | Hansen et al. ............... 426/421 |
| 5,756,136 A * | 5/1998 | Black et al. ................... 426/89 |

FOREIGN PATENT DOCUMENTS

| EP | 0408756 | * | 1/1991 |
| JP | 1196254 | * | 8/1989 |
| JP | 3198738 | * | 8/1991 |

OTHER PUBLICATIONS

Nozaki, A., Patent Abstracts of Japan, abstracting JP 01–196254, Aug. 1989.*
Kuramoto et a, Patent Abstracts of Japan, abstracting JP 06–14708, Jan. 1994.*
97(07): PO191 FSTA, Dairy Industries International 1996, 61(5) 43.*
21 C.F.R.§ 131.203 and 131.206, Apr. 1993.

* cited by examiner

*Primary Examiner*—Leslie Wong
(74) *Attorney, Agent, or Firm*—Schwegman, Lundberg, Woessner & Kluth, P.A.

(57) ABSTRACT

A process for preparing yogurt takes advantage of the discovery that a form of modified whey characterized by a calcium content of at least 3%, protein content of from 10 to 20%, and a phospholipid content of at least 2%, has the ability to impart a creamy texture to yogurt while increasing its calcium content, Preferred products have calcium contents such that each serving contains from about 25 to about 50% of the Daily Value figure of 1000 mg per day.

3 Claims, No Drawings

REDUCED FAT YOGURT PREPARATION

TECHNICAL FIELD

The invention relates to preparation of creamy, calcium-fortified yogurt. In its more preferred aspects, it provides yogurt products having less fat than those prepared with whole milk, yet which have higher calcium contents and consistencies reminiscent of whole milk products.

Consumer interest in weight control and healthy eating is driving food processors to increase their offerings of foods having reduced fat contents and high nutritional value. Yogurt is perceived as a healthy food for a number of reasons. It is natural, contains calcium derived form milk and is associated with healthy digestion and other benefits. Typically, yogurt has a fat content only as high as cows milk, from which it is most often made. Even so, many health-conscious consumers would want even lower fat contents and even higher calcium contents. Unfortunately, the removal of fat decreases the smooth texture and nice color associated with yogurt, and the addition of calcium has caused a number of problems, including gritty mouthfeel and reduced protein heat stability.

While a number of efforts have been made to address these interrelated problems, the art is in need of effective solutions.

BACKGROUND ART

Yogurt has been prepared for centuries in essentially the same way. It was reportedly developed out of the need to preserve milk in warm climates like the Middle East. See, for example, Hui, *Dairy Science & Technology Handbook*, Vol. 2., Product Manufacturing, 1993, pp. 1–5. As originally developed, it has been considered a health food, but there is interest in reducing its fat content and/or increasing its calcium content. However, these modifications have proved to be significant technical challenges.

Yogurt is prepared by heating milk sufficiently to inactivate microorganisms in it, cooling from the high temperature, inoculating with a suitable culture (e.g., adding a small amount of a previous batch of yogurt), holding at a temperature near ambient or just above for long enough (e.g., 3 to 6 hours) for the active cultures to produce enough acid to coagulate the milk, and then cooling the resulting yogurt. A natural consequence of the culturing process is the production of lactic acid. The acid has several benefits, including creating a smooth, creamy texture, providing a clean, fresh taste and aiding preservation. If the yogurt is made with good manufacturing practices and cultured until the pH is less than about 4.6, the product should be stable for several weeks under refrigeration. Thus, maintaining the natural culturing process and results are important.

U.S. Pat. No. 5,449,523 to Hansen, et al., identifies a number of problems with adding calcium to yogurt. The patent indicates that some sources of calcium can cause grittiness and that others can cause the protein in milk to coagulate during heat treatment. Their solution to the problem involves adding chelating and/or alkaline agents, in addition to a calcium supplement, to maintain the pH above 6.7 prior to pasteurization. They were unable to identify any calcium supplement that did not require at least some change in the yogurt manufacturing procedure.

Attempts by the prior art to reduce fat in yogurt have also been met with technical challenges. By definition, yogurt must contain at least 8.25% milk-solids-non-fat before the addition of any bulky flavors. The milkfat content of regular yogurt must be at least 3.25%. (21 C.F.R. §131.200) When either lowfat yogurt (21 C.F.R. §131.203) or nonfat yogurt (21 C.F.R. §131.206) is prepared, the fat content is reduced, thereby reducing the total solids and making the yogurt thin and watery. Various food additives have been identified to return the rheological properties and mouthfeel of these products to those of their full-fat counterparts. Widely used among these are whey and whey protein concentrates. Whey is the dried residue of the liquid obtained by the separation of curd in cheese making. Whey protein concentrate is a product obtained from whey wherein whey is "modified by partial or complete removal of lactose and or minerals, to increase the nonfat solids content of the food" (e.g., see 21 C.F.R. §131.203(d)).

It is common for whey and/or whey protein concentrates to be employed along with other stabilizers such as gelatin, starch, vegetable and synthetic gums and the like. These materials as a group tend to increase the smoothness of the yogurt and decrease syneresis. An ideal stabilizer would yield a yogurt product which at the time of making and to the end of its shelf life, was the same in taste and texture as a full-fat, natural yogurt. The stabilizer should be easily mixed and should not adversely affect processing, flavor or texture. Stabilizers as currently available, however, do not significantly increase the calcium content.

There remains a need for a yogurt stabilizer and process for utilizing it that improves yogurt texture and increases the calcium content without adversely affecting taste, processing or product stability.

DISCLOSURE OF THE INVENTION

It is an object of the invention to provide a yogurt product with enhanced texture.

It is another object of the invention to provide a yogurt product with increased calcium content.

It is another object of the invention to provide a yogurt product having an enhanced smooth and creamy texture.

It is still another object of the invention to provide a yogurt-based product or ingredient with enhanced texture and/or calcium content.

It is another and more specific object of the invention to provide a process for preparing yogurt products having reduced fat contents, without sacrificing the viscosity and mouthfeel of yogurt prepared from whole milk.

It is yet another and more specific object of the invention to provide a process for preparing low-fat yogurt products exhibiting viscosity and mouthfeel reminiscent of yogurt prepared from whole milk.

It is another and more specific object of the invention to provide a process for preparing yogurt products having increased calcium contents, without causing processing, texture or stability problems.

It is yet another and more specific object of the invention to provide a process for preparing high-calcium, low-fat yogurt products exhibiting viscosity and mouthfeel reminiscent of yogurt prepared from whole milk.

These and other objects are achieved by the present invention, which provides a process for preparing a yogurt having an improved texture and containing active cultures, comprising: admixing milk with a modified whey characterized, on an as is basis, by a calcium content of at least 3%, protein content of from 10 to 20%, and a phospholipid content of at least 2% and a yogurt culture; holding the culture at a temperature and for a time effective to produce yogurt. The process is applicable to yogurt made from whole milk or meeting the standards for lowfat or nonfat products. The products prepared in the above manner are unique in composition and properties.

Many of the preferred aspects of the invention are described below.

Industrial Applicability

The following description will illustrate the preparation of preferred yogurt products according to the invention. The processing will be described in terms of the procedures effective for the materials employed in the various formulations.

The term "yogurt" is used herein to mean all of those products meeting the definition as set forth in 21 C.F.R. §§131.200, 131.203, and 131.206. Of the above sections, 21 C.F.R. §131.203 specifically relates to lowfat yogurt and 21 C.F.R. §131.206 specifically relates to nonfat yogurt. The invention improves the production of products of these types by providing better body and added calcium. For lowfat and nonfat products, the invention provides more of the body and mouthfeel of regular full-fat yogurt than has been achievable using ingredients described in the prior art.

The preferred products of the invention contain live and active cultures, as is required by the definition agreed to by the National Yogurt Association. Generally, these products are made by fermenting milk or a milk mix with a symbiotic blend of *Streptococcus salvarius* (e.g., subsp. Thermophilus) and *Lactobacillus debruechii* (e.g., subsp. Bulgaricus). See Hui, *Dairy Science & Technology Handbook*, Vol. 2., Product Manufacturing, 1993, pp. 1–55, and the references cited therein for a more detailed description, which is hereby incorporated by reference. The result is a semisolid fermented product having clean taste, a smooth texture and quick melting action in the mouth. Unlike prior art products, those of the invention contain more calcium and can be made with less fat while retaining a texture close to that desired of full-fat yogurt products.

Basic to all of the embodiments of the invention is a "modified whey", which is defined as a whey fraction characterized, on an as is basis, by a calcium content of at least 3%, protein content of from 10 to 20% (more narrowly, 12 to 18%), and a phospholipid content of at least 2%. The calcium content is in highly soluble form and is homogeneously dispersed therein, as can be obtained by codrying a mixture containing the calcium, protein, fat and sugar components separated In these amounts to form the whey fraction. Calcium in this form is distinguished from calcium added as a salt that is simply mixed In dry form with whey. Preferred forms of modified whey are further characterized as conforming to the following analysis, based on a 100 gram sample.

| COMPONENT | PREFERRED | RANGE |
| --- | --- | --- |
| Calories (Kcal) | 320 | 300–340 |
| Total Fat (g) | 4 | 2–5 |
| Saturated Fat (g) | 2.5 | 1–4 |
| Extractable Fat (g) [a] | 2 | 1–4 |
| Cholesterol (mg) | 100 | <200 |
| Total Carbohydrates (g) | 55 | 50–60 |
| Sugars (g) | 55 | 50–60 |
| Total Protein (g) | 14–16 | 10–20 (e.g., 12–18) |
| Calcium (g) | 5 | 3–10 (e.g., 4–6) |
| Sodium (g) | 1 | <2 |
| Iron (mg) | 0.5 | <1 |
| Riboflavin (g) | .8 | <1 |
| Phosphorus (g) | 2 | 1–3 |
| Potassium (g) | 1.5 | 1–2 |
| Magnesium (g) | .200 | <1 |
| Ash (g) | 20 | 15–25 |
| Moisture (g) | 5 | 1–6 |

[a] Substantially all fat is phospholipid.

This form of modified whey differs greatly from either sweet whey or whey protein concentrates and isolates, principally in the noted characterizing features set out above, and the ratios given directly below. Typical calcium to phosphorous ratios are within the range of from about 2:1 to about 10:1, e.g., about 5:2. Similarly, typical calcium to protein ratios are within the range of from about 1:4 to about 4:5, e.g., about 1:3. And, typical calcium to fat (essentially as phospholipid) ratios of from about 3:1 to about 10:1, e.g., about 4:1.

Products meeting these specifications can be prepared from whey by fractionation and drying to obtain the noted composition. Modified whey defined in this manner, derived from dairy products by fractionation, is believed to have its superior affects on yogurt prepared in accord with the invention because the high calcium content is complexed with other dairy components. Modified whey products of this type are commercially available, for example, under the trademark VersaPRO (e.g., grades B, C, D, E, M, N, S) from Davisco Foods International, Inc., Le Sueur, Minn.

A modified whey of this type is employed in an amount effective to improve the creaminess of the final yogurt. Preferred amounts will be at least about 0.25% based on the total weight of the formulation not counting bulky flavorings, and preferably within the range of from about 0.5 to about 2%. Preferred levels in lowfat and nonfat products are within the range of from abut 0.50 to about 1.25% on the same basis. Preferred products have calcium contents such that each serving contains from about 25 to about 50% of the Daily Value figure of 1000 mg per day.

The process of the invention entails treating milk containing the above form of modified whey to otherwise conventional processing. This is a surprising advantage of the invention. The milk is selected from any of the sources suitable and approved by the regulations, mixed with the modified whey and other additives such as flavors, sweeteners and stabilizers. The milk, or a milk mix containing other permitted ingredients, is heated under conditions effective to inactivate any organisms or enzymes. The milk or milk mix is then inoculated with a suitable culture (with a symbiotic blend of *Streptococcus salvarius* and *Lactobacillus debruechii*) and held for a time sufficient to develop the typical yogurt texture and taste. Holding at near 30 to 45° C. for from 3 to 6 hours is typical. The final pH will typically be less than 5.0 (e.g., within the range of from about 4.2 to about 4.6). Following this step of culturing, the yogurt is cooled to slow down the culturing but not kill the culture.

The source of the milk can be any of those sources as by tradition, regulation or standard have come into favor. Principal among these are milk from cows, sheep, goats, buffalo, and the like. The milk can be fresh or in other forms permitted by regulation, including milk mixes with non-fat dry milk or the like. Various other materials can also be added to the milk mix prior to fermentation so long as they do not adversely affect the final quality of the yogurt or change its identity. For simplicity In description, the term "milk" as used herein is also intended to include culturable milk mixes as permitted by regulation. The yogurt prepared according to the invention can be packaged plain or with sweeteners or flavors.

A sweetener is optional, but can be a sugar, sugary material or other sweetener, such as any of the high intensity sweeteners known to the art. The sweeteners can be employed directly in the milk or as part of a bulky flavoring that is added after fermentation. Bulky flavorings can be added to the bottom of individual containers in which the yogurt is cultured and ultimately distributed, or can be mixed into the yogurt following culturing. The bulky flavoring can be on the bottom of the container, sundae style, custard style or striped, as called for by the consumer interest desired.

Among the sugars are the mono-saccharides, di-saccharides and polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides.

Among the intense sweeteners are acesulfame-K, aspartame, cyclamates, dihydrochalcone, saccharin, stevioside, thaumatin and the like. Also, low-intensity, low-calorie sweeteners such as sorbitol and erythritol can be employed.

Other ingredients may also be employed to impart their characteristic effects to the compositions of the present invention. Typical of such ingredients are flavoring agents, colorants, vitamins, minerals, and the like. Various flavors can be added directly to the milk prior to culturing if they do not interfere with the culturing process or afterwards if they would. Suitable flavoring agents can be employed to impart vanilla, cream, chocolate, coffee, maple, spice, mint, butter, caramel, fruit and other flavors.

When a bulky flavoring or sweetener is added to the yogurt after fermentation, the natural consistency of the yogurt is modified and it becomes necessary to add stabilizers of a type and in an amount sufficient to restore a natural yogurt-like texture. Stabilizers can also be added prior to naturally setting the yogurt for the purpose of enhancing smoothness and decreasing syneresis during long periods of storage. Typical of the stabilizers are proteinaceous materials such as gelatin, pectin, and whey protein concentrate, natural and synthetic hydrophilic colloids, such as carboxymethyl cellulose, vegetable gums such as locust bean gum, carob bean gum, guar gum, carggeenans and alginates and various starches and modified starches. The stabilizers are typically added prior to fermentation to assure thorough mixing with least affecting natural texture.

Tests have indicated that when bulky flavoring materials are to be mixed in with the yogurt subsequent to fermentation, the texture will be broken but can be essentially reestablished by utilizing effective amounts of stabilizers such as gelatin and/or starch, preferably before pasteurization. The starch and gelatin should be employed in amounts sufficient to restore a semisolid texture. It is an advantage of the invention that a very nice yogurt texture with a clean flavor can be achieved.

The following Examples are provided to further illustrate and explain a preferred form of the invention and are not to be taken as limiting in any regard, Unless otherwise indicated, all parts and percentages are by weight.

EXAMPLE 1

This example describes the preparation of a preferred unflavored, full-fat yogurt, made from the following ingredients.

| Ingredient | Weight % |
|---|---|
| Homogenized Milk | 92–98.5 |
| Non-fat Dry Milk | 1–3 |
| Modified Whey | 0.5–2 |
| Thickening Agents | 0–3 |

A milk mix containing the above ingredients is prepared and then is heated to 88–96° C. for 15–45 minutes to inactivate any organisms or enzymes present in the milk mix. The milk mix is then cooled to about 30–45°C. and inoculated with a suitable culture (e.g., about 1–5% by weight of a portion of yogurt purchased comercially, containing *Streptococcus salvarius* and *Lactobacillus debruechii*). The milk mix containing the culture is then held for a time period of about 5 hours, sufficient to develop the typical yogurt texture and taste, while holding at near 50° C. The final pH will typically be less than 5. Following this step of culturing, the yogurt is cooled to stop the culturing but not inactivate or kill the culture.

EXAMPLE 2

This example describes the preparation of a preferred unflavored, lowfat yogurt, made from the following ingredients, containing a bulky flavoring comprising fruit mixed with the yogurt.

| Ingredient | Weight % |
|---|---|
| Skimmed Milk | 90–97.5 |
| Non-fat Dry Milk | 2–5 |
| Modified Whey | 0.5–2.0 |
| Thickening Agents | 0–3.0 |

EXAMPLE 3

This example describes the preparation of a preferred unflavored, nonfat yogurt, made from the following ingredients.

| Ingredient | Weight % |
|---|---|
| Skimmed Milk | 90–97.5 |
| Non-fat Dry Milk | 2–5.0 |
| Modified Whey | 0.5–2.0 |
| Thickening Agents | 0–3.0 |

The yogurt of this example is processed in the same manner as that in Example 2.

The unflavored yogurts of each of the above examples can be packaged unflavored or can be employed in the preparation fruit-on-the-bottom, sundae style, custard style, or striped yogurt products. The variations in processing to achieve these various forms are well understood. It is surprising, however, that the products of the invention are so adaptable to providing products of these various types with such high quality.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A process for preparing a yogurt having an improved texture and containing active cultures, comprising:

admixing milk with a modified whey characterized on an as is basis by a calcium content of from 3–10% of the modified whey, protein content of from 14 to 18% of the modified whey, and a phospholipid content of at least 2% of the modified whey and a yogurt culture, wherein the modified whey is employed in the yogurt in an amount of from 0.5 to 1.25% based on the weight of the yogurt; and holding the culture at a temperature and for a time effective to produce yogurt.

2. A product of the process of claim 1.

3. A product of the process of claim 1, wherein each serving contains from about 25 to about 50% of the Daily Value figure for calcium of 1000 mg per day.

* * * * *